United States Patent
Montgomery et al.

(10) Patent No.: US 9,760,500 B2
(45) Date of Patent: *Sep. 12, 2017

(54) CACHING SCHEME SYNERGY FOR EXTENT MIGRATION BETWEEN TIERS OF A STORAGE SYSTEM

(71) Applicant: International Business Machines Corporation, Armonk, NY (US)

(72) Inventors: David Montgomery, San Jose, CA (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,036

(22) Filed: Jun. 7, 2016

(65) Prior Publication Data
US 2016/0292084 A1  Oct. 6, 2016

Related U.S. Application Data

(63) Continuation of application No. 14/598,178, filed on Jan. 15, 2015, now Pat. No. 9,396,133, which is a
(Continued)

(51) Int. Cl.
*G06F 12/12* (2016.01)
*G06F 12/128* (2016.01)
(Continued)

(52) U.S. Cl.
CPC .......... *G06F 12/128* (2013.01); *G06F 3/0608* (2013.01); *G06F 3/0613* (2013.01); *G06F 3/0641* (2013.01); *G06F 3/0647* (2013.01); *G06F 3/0649* (2013.01); *G06F 3/0655* (2013.01); *G06F 3/0685* (2013.01); *G06F 12/0866* (2013.01); *G06F 12/0875* (2013.01); *G06F 12/12* (2013.01); *G06F 12/122* (2013.01);
(Continued)

(58) Field of Classification Search
CPC .... G06F 12/123; G06F 3/0613; G06F 3/0649; G06F 3/0685; G06F 12/0866; G06F 12/0897
See application file for complete search history.

(56) References Cited

U.S. PATENT DOCUMENTS 6,732,245 B2   5/2004   Kaiya et al.
7,412,543 B2   8/2008   Ohno et al.
(Continued)

OTHER PUBLICATIONS

Montgomery et al., U.S. Appl. No. 14/598,178, filed Jan. 15, 2015.
(Continued)

*Primary Examiner* — Vanthu Nguyen
(74) *Attorney, Agent, or Firm* — Zilka-Kotab, P.C.

(57) ABSTRACT

A method includes determining to move an extent from a source-tier in a storage system to a destination-tier in the storage system, wherein a set of tracks of the extent is presently being accessed. In response to determining that a parameter of the extent exceeds a migration threshold, a destination-tier cache is populated with tracks as they are removed from a read-stack associated with the source-tier and/or a write-stack associated with the source-tier using a predetermined read-to-write ratio.

17 Claims, 4 Drawing Sheets

Related U.S. Application Data continuation of application No. 13/484,123, filed on May 30, 2012, now Pat. No. 8,958,253, which is a continuation of application No. 12/875,031, filed on Sep. 2, 2010, now Pat. No. 8,345,489.

(51) Int. Cl.
*G06F 3/06* (2006.01)
*G06F 12/0866* (2016.01)
*G06F 12/123* (2016.01)
*G06F 12/0875* (2016.01)
*G06F 12/122* (2016.01)
*G06F 12/0897* (2016.01)

(52) U.S. Cl.
CPC ........ *G06F 12/123* (2013.01); *G06F 12/0897* (2013.01); *G06F 2212/314* (2013.01); *G06F 2212/451* (2013.01); *G06F 2212/69* (2013.01)

(56) References Cited

U.S. PATENT DOCUMENTS

| | | | |
|---|---|---|---|
| 7,509,409 B2 | 3/2009 | Penny et al. | |
| 7,539,709 B1 | 5/2009 | Vengerov et al. | |
| 7,549,016 B2* | 6/2009 | Fujibayashi | G06F 3/0613 711/112 |
| 7,716,441 B2 | 5/2010 | Kano | |
| 7,895,398 B2* | 2/2011 | Shet | G06F 12/0871 711/129 |
| 8,051,243 B2 | 11/2011 | Murase | |
| 8,131,671 B2* | 3/2012 | Mullen | G06F 17/30079 707/610 |
| 8,224,782 B2 | 7/2012 | Murase | |
| 8,230,123 B2 | 7/2012 | Chiu et al. | |
| 8,245,272 B2 | 8/2012 | Sasaki et al. | |
| 8,345,489 B2 | 1/2013 | Montgomery et al. | |
| 8,958,253 B2 | 2/2015 | Montgomery et al. | |
| 9,396,133 B2 | 7/2016 | Montgomery et al. | |
| 2004/0250011 A1 | 12/2004 | Chen et al. | |
| 2006/0236056 A1 | 10/2006 | Nagata | |
| 2008/0016021 A1* | 1/2008 | Gulbeden | G06F 17/30171 |
| 2009/0276588 A1 | 11/2009 | Murase | |
| 2010/0082765 A1 | 4/2010 | Murase | |
| 2011/0191554 A1 | 8/2011 | Sakai et al. | |
| 2011/0246739 A1 | 10/2011 | Matsuda et al. | |
| 2012/0057407 A1 | 3/2012 | Montgomery et al. | |
| 2012/0239864 A1 | 9/2012 | Montgomery et al. | |
| 2015/0127881 A1 | 5/2015 | Montgomery et al. | |

OTHER PUBLICATIONS

Non-Final Office Action from U.S. Appl. No. 14/598,178, dated Nov. 24, 2015.
Montgomery et al., U.S. Appl. No. 12/875,031, filed Sep. 2, 2010.
Notice of Allowance from U.S. Appl. No. 12/875,031, dated Aug. 24, 2012.
Supplemental Notice of Allowability from U.S. Appl. No. 12/875,031, dated Oct. 29, 2012.
Montgomery et al., U.S. Appl. No. 13/484,123, filed May 30, 2012.
Non-Final Office Action from U.S. Appl. No. 13/484,123, dated May 20, 2014.
Notice of Allowance from U.S. Appl. No. 13/484,123, dated Oct. 6, 2014.
Hill, D., "Commentary: IBM Easy Tier Enables DS8700 Users to Make Good Use of Solid State Drives," Mesabi Group LLC, Apr. 12, 2010, 6 pages.
Zhang et al., "Automated Lookahead Data Migration in SSD-enabled Multi-tiered Storage Systems," IEEE, May 2010, vol. 10, 6 pages.
Notice of Allowance from U.S. Appl. No. 14/598,178, dated Apr. 18, 2016.

* cited by examiner

CACHING SCHEME SYNERGY FOR EXTENT MIGRATION BETWEEN TIERS OF A STORAGE SYSTEM

BACKGROUND

The present invention relates to data storage systems, and more particularly, this invention relates to a caching scheme for extent migration.

In current hybrid tiered-storage systems, higher level solid state device (SSD) tiers suffer caching performance problems with respect to sequential-writes, as the current caching algorithms in place, such as CLOCK, CSCAN, WOW, etc., are tier ambiguous, and typically designed to leverage spatial locality, which is a performance consideration for hard disk drives (HDDs). One of the draw-backs of this configuration is that although these algorithms work well for HDDs (e.g., in reducing platter seeks), they are not suited for SSD device pools in a tiered-storage environment.

In a typical hybrid SSD/HDD tiered-storage system, SSDs display their greatest performance improvement over HDDs in performing random write operations. However, with only one ambiguous (non tier-specific) caching algorithm in-place, SSD tracks exhibiting this property are not optimally cached (e.g., due to a lack of hits), thus reducing the overall system performance. Another drawback of utilizing a singular cache and algorithm for multiple tiers is that there is no practical method of mapping a specific caching algorithm to a specific tier, thus optimal caching cannot be achieved.

Therefore, a method, such as a caching scheme, which utilizes and takes advantage of the improved performance of SSDs in a hybrid HDD/SSD tiered-storage system would be very beneficial to the field of data storage. Moreover, use of such a caching scheme in other tiered-storage systems may also be desirable.

BRIEF SUMMARY

According to one embodiment, a storage system includes: a processor and logic integrated with and/or executable by the processor. The logic is configured to: determine, using the processor, to move an extent from a source-tier in a storage system to a destination-tier in the storage system, wherein a set of tracks of the extent is presently being accessed; and populate a destination-tier cache with tracks as they are removed from a read-stack associated with the source-tier and/or a write-stack associated with the source-tier using a predetermined read-to-write ratio in response to determining that a parameter of the extent exceeds a migration threshold.

According to another embodiment, a computer-implemented method includes: determining to move an extent from a source-tier in a storage system to a destination-tier in the storage system, wherein a set of tracks of the extent is presently being accessed; and in response to determining that a parameter of the extent exceeds a migration threshold, populating a destination-tier cache with tracks as they are removed from a read-stack associated with the source-tier and/or a write-stack associated with the source-tier using a predetermined read-to-write ratio.

According to yet another embodiment, a computer program product includes a computer readable storage medium having program instructions embodied therewith. The program instructions are executable by a processor to cause the processor to perform a method comprising: determining, by the processor, to move an extent from a source-tier in a storage system to a destination-tier in the storage system, wherein a set of tracks of the extent is presently being accessed; and populating, by the processor, a destination-tier cache with tracks as they are removed from a read-stack associated with the source-tier and/or a write-stack associated with the source-tier using a predetermined read-to-write ratio in response to determining that a parameter of the extent exceeds a migration threshold.

Other aspects and embodiments of the present invention will become apparent from the following detailed description, which, when taken in conjunction with the drawings, illustrate by way of example the principles of the invention.

DETAILED DESCRIPTION

Figure 1:
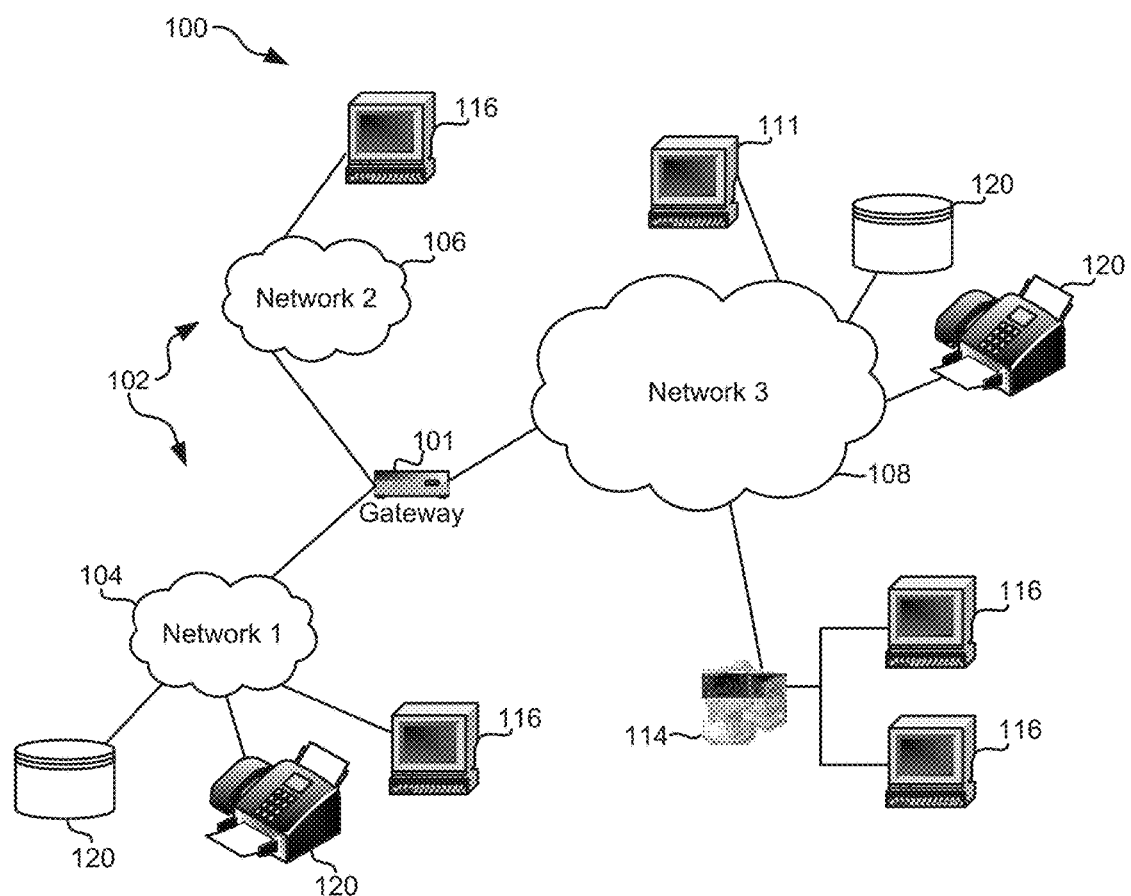
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of storage systems, particularly systems employing hybrid hard disk drive (HDD)/solid state device (SSD) tiered-storage systems, as well as operation and/or component parts thereof.

In one general embodiment, a storage system includes logic adapted for determining to move an extent from a source-tier in a storage system to a destination-tier in the storage system, wherein a set of tracks of the extent is presently being accessed; logic adapted for determining whether any track from the set of tracks is presently being written to; logic adapted for designating to a write-stack associated with the source-tier each track that is presently being written to and designating to a read-stack associated with the source-tier remaining tracks from the set of tracks; logic adapted for removing oldest tracks from the read-stack and the write-stack until the read-stack and the write-stack have been depleted of tracks; logic adapted for populating a destination-tier cache with the tracks as they are removed from the read-stack and the write-stack using a predetermined read-to-write ratio when a parameter of the extent exceeds a migration threshold; logic adapted for removing any tracks from a source-tier cache that were removed from the read-stack and the write-stack; and logic adapted for migrating the extent from the source-tier to the destination-tier.

In another general embodiment, a method includes determining to move an extent from a source-tier in a storage system to a destination-tier in the storage system, wherein a set of tracks of the extent is presently being accessed; determining whether any track from the set of tracks is presently being written to; designating to a write-stack associated with the source-tier each track that is presently being written to and designating to a read-stack associated with the source-tier remaining tracks from the set of tracks; and removing oldest tracks from the read-stack and the write-stack until the read-stack and the write-stack have been depleted of tracks. When a parameter of the extent exceeds a migration threshold, the method further includes populating a destination-tier cache with the tracks as they are removed from the read-stack and the write-stack using a predetermined read-to-write ratio; and removing any tracks from a source-tier cache that were removed from the read-stack and the write-stack. The extent is migrated from the source-tier to the destination-tier.

In yet another general embodiment, a computer program product for re-encrypting data includes a computer readable storage medium having computer readable program code embodied therewith, the computer readable program code including: computer readable program code configured to determine to move an extent from a source-tier in a storage system to a destination-tier in the storage system, wherein a set of tracks of the extent is presently being accessed; computer readable program code configured to determine whether any track from the set of tracks is presently being written to; computer readable program code configured to designate to a write-stack associated with the source-tier each track that is presently being written to and designate to a read-stack associated with the source-tier remaining tracks from the set of tracks; computer readable program code configured to remove oldest tracks from the read-stack and the write-stack until the read-stack and the write-stack have been depleted of tracks; computer readable program code configured to populate a destination-tier cache with the tracks as they are removed from the read-stack and the write-stack using a predetermined read-to-write ratio when a parameter of the extent exceeds a migration threshold; computer readable program code configured to remove any tracks from a source-tier cache that were removed from the read-stack and the write-stack; and computer readable program code configured to migrate the extent from the source-tier to the destination-tier.

In a tiered-storage system, the decision to promote an extent between associated tiers may be profiling-based, meaning that the extents I/O access profile determines when and where to migrate the associated extent. According to one embodiment, this migration process is leveraged by 'seeding' a cache for a destination-tier, such as a SSD tier-dedicated least-recently-accessed (LRA) cache biased for non-sequential writes, from a migrating extent located on a source-tier. The cache may include a last-in, first-out (LIFO) buffer, according to one embodiment. The advantages to this method of managing migration events include increased performance (increased cache hits) for the entire tiered-storage system, increased longevity of the higher performing tier's storage devices, such as SSD drives, reduced number of overall migrations, e.g., as cache hits affect extent migration associated migration, as potential write-though data access is reduced and is tier-balanced, not HDD heavy, etc. According to one embodiment, a dedicated cache and associated non-volatile storage (NVS) for each tier may be provided. This dedicated cache may be a physical element, a logical separation partitioning of a shared cache, etc.

The description provided herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "logic," "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. In the context of the present network architecture 100, the networks 104, 106 may each take any form including, but not limited to a LAN, a WAN such as the Internet, WLAN, PSTN, internal telephone network, etc.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
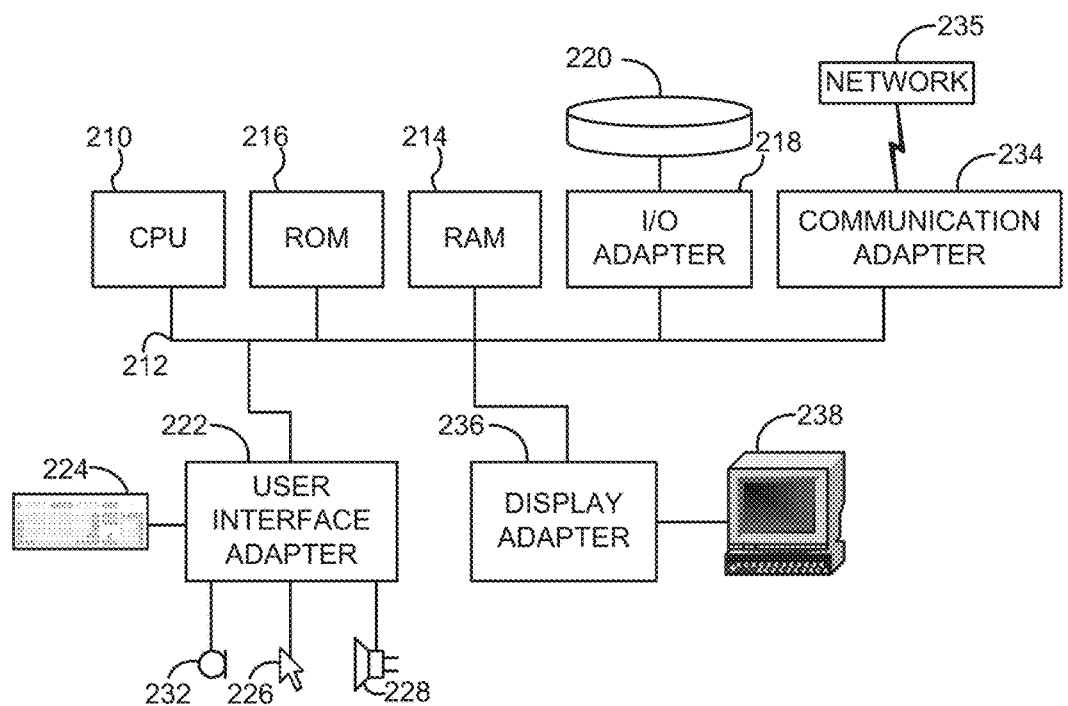
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components, software, and/or firmware components.

Figure 3:
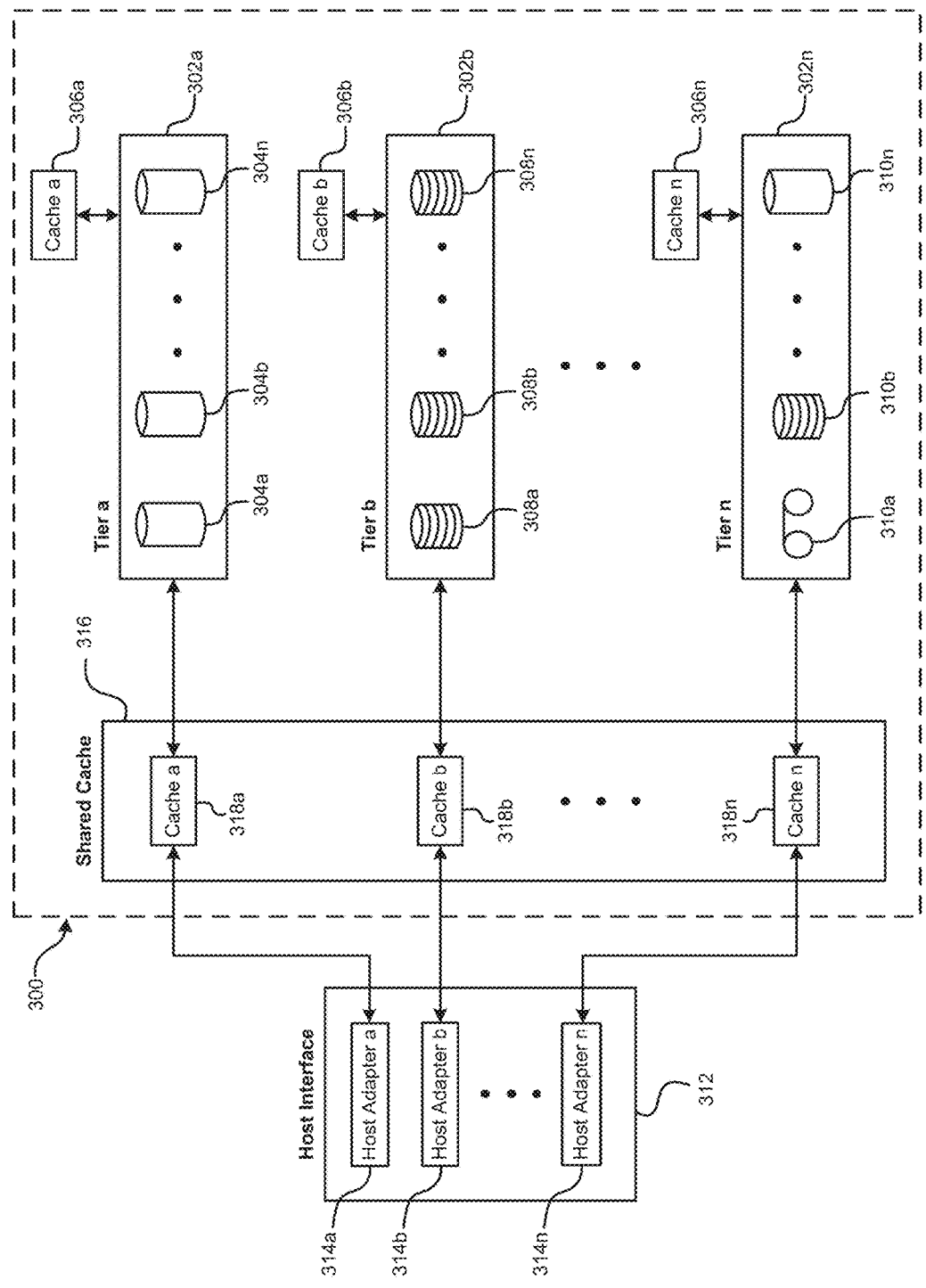
FIG. 3 shows a storage system according to one embodiment.

With reference to FIG. 3, a hybrid multi-tiered storage system 300 is shown according to one embodiment. The system 300 is an example of the components which may be in a storage system that may be used in accordance with other embodiments described herein. Of course, other components not described here may also be in the storage system 300, according to various embodiments.

As shown in FIG. 3, the storage system 300 may include any number of storage tiers, such as Tier a 302a, Tier b 302b, . . . Tier n 302n. Each storage tier 302a, 302b, . . . 302n may include the same type of storage memory media, such as HDDs, SSDs, sequential access media (tape in tape drives, optical disk in optical disk drives, etc.), direct access media (CD-ROM, DVD-ROM, etc.), or any combination of media storage types. For example, Tier n 302n shows tape drive media 310a, HDD media 310b, and SSD media 310n, which illustrates that each tier may have many different types of storage media. In one such configuration, a first tier, such as tier 302a, may include a majority of SSD storage media 304, 304b, . . . , 304n for storing data in a higher performing storage environment, and remaining tiers 302a, 302b, . . . 302n may include any combination of SSDs, HDDs, tape drives, etc., for storing data in a lower performing storage environment. In this way, more frequently accessed data, data having a higher priority, data needing to be accessed more quickly, etc., may be stored to the first tier 302*a*, while data not having one of these attributes may be stored to the lower tiers 302*b* . . . 302*n*. Of course, one of skill in the art, upon reading the present descriptions, may imagine many other combinations of storage media types to implement and storage schemes, according to the embodiments presented herein.

In one approach, the storage system 300 may be coupled to a host interface 312. The host interface may include one or more host adapters 314*a*, 314*b*, . . . , 314*n*. Each host adapter may be coupled to a single storage tier. For example, host adapter 314*a* is coupled to Tier a 302*a*.

According to one embodiment, one of the destination-tier and the source-tier may include SSD storage media, and the other tier may include at least one of: SSD, HDD, and magnetic tape drive storage media.

In one embodiment, the storage system 300 may include a shared cache 316, which may be shared by two or more of the storage tiers 302*a*, 302*b*, . . . 302*n*. The shared cache 316 may include NVS such as Flash memory, SSDs, etc., random access memory such as RAM, HDDs, combinations thereof, etc., according to various embodiments. The shared cache 316 may be partitioned into individual caches 318*a*, 318*b*, . . . 318*n* to support each individual storage tier 302*a*, 302*b*, . . . 302*n* for which the individual cache 318*a*, 318*b*, . . . 318*n* is associated, according to one embodiment. Of course, the shared cache 316 may also be a collection of storage that is accessible by each individual storage tier 302*a*, 302*b*, . . . 302*n*, according to another embodiment.

According to another embodiment, any storage tier 302*a*, 302*b*, . . . 302*n* may have a dedicated cache 306*a*, 306*b*, . . . 306*n* associated with the storage tier 302*a*, 302*b*, . . . 302*n*. More particularly, in one embodiment, each individual storage tier 302*a*, 302*b*, . . . 302*n* may have its own dedicated cache 306*a*, 306*b*, . . . 306*n*, some storage tiers 302*a*, 302*b*, . . . 302*n* may have a dedicated cache 306*a*, 306*b*, . . . 306*n*, or one storage tier 302*a* may have a dedicated cache 306*a*. The dedicated cache 306*a*, 306*b*, . . . 306*n* may provide flexibility and/or efficiency to the storage system 300, and may improve system performance over using a shared cache system.

In some systems, a shared cache 316 and dedicated caches 306*a*, 306*b*, . . . 306*n* may be used in concert to provide cache for the storage tiers 302*a*, 302*b*, . . . 302*n*, according to one approach, or only one type of cache 316 or 306*a*, 306*b*, . . . 306*n* may be used, in another approach.

One of the problems associated with conventional tiered-storage systems is that when data is migrated, e.g., from a lower performing tier up to a higher performing tier, from a higher performing tier down to a lower performing tier, etc., the overall system performance may be negatively affected. This may be due to requests being delayed due to the migration of the data, data migrated to a destination tier which does not reflect changes that were made to the data on the source tier during the migration, etc.

In order to mitigate these performance issues with conventional tiered-storage systems, several approaches may be taken. In one approach, as shown in FIG. 3, dedicated caches 306*a*, 306*b*, . . . 306*n* may be associated with each storage tier 302*a*, 302*b*, . . . 302*n*.

In another approach, the storage system 300 may include logic for handling migration of data between storage tiers 302*a*, 302*b*, . . . 302*n*. For example, the storage system 300 may include logic adapted to move an extent from a source-tier (such as 302*a*) in a storage system 300 to a destination-tier (such as 302*b*) in the storage system 300. According to this embodiment, a set of tracks of the extent is presently being accessed, e.g., the set of tracks are either being written to or being read. The storage system 300 may also include logic adapted for determining whether any track from the set of tracks is presently being written to, logic adapted for designating to a write-stack associated with the source-tier 302*a* each track that is presently being written to and designating to a read-stack associated with the source-tier 302*a* remaining tracks from the set of tracks, logic adapted for removing oldest tracks from the read-stack and the write-stack until the read-stack and the write-stack have been depleted of tracks, (when a parameter of the extent exceeds a migration threshold, the storage system 300 may also include logic adapted for populating a destination-tier cache, such as 306*b* associated with destination tier 302*b*, with the tracks as they are removed from the read-stack and the write-stack using a predetermined read-to-write ratio and logic adapted for removing any tracks from a source-tier cache, such as 306*a* associated with source tier 302*a*, that were removed from the read-stack and the write-stack), and logic adapted for migrating the extent and from the source-tier 302*a* to the destination-tier 302*b*.

Of course, other logic may be included in the storage system 300, as would be apparent to one of skill in the art upon reading the present descriptions.

According to one embodiment, the write-stack and the read-stack may be configured to have buffers that operate in a last-in, first-out (LIFO) arrangement. The buffer arrangement may affect the order in which tracks are removed from the write-stack and read-stack. For example, if the buffers have a first-in, first-out (FIFO) arrangement, then the tracks removed from the write-stack and the read-stack may be the newest tracks.

In one approach, the migration threshold may be of a type known in the art, such as a minimum or maximum number of tracks accessed, a minimum or maximum frequency of data access, etc. In addition, the parameter may be related to a frequency of data access requests in the extent, according to one embodiment. For example, if data in an extent on the source-tier is being accessed frequently, then the extent may be a candidate to be promoted up to a higher performing tier. Conversely, in another approach, if data in an extent on the source-tier is being accessed infrequently, then the extent may be a candidate to be demoted down to a lower performing tier. Of course, other migrations are possible, and the parameter may be based on any criteria as would be apparent to one of skill in the art upon reading the present descriptions, such as data priority, data's last accessed date, frequency of data access, meta-data associated with the data or the extent, etc.

In another approach, the read-to-write ratio may be of any type known in the art. In one embodiment, the read-to-write ratio may be determined based on an amount of tracks in the write-stack as compared to an amount of tracks in the read-stack. For example, if the write-stack has twice as many tracks as the read-stack, then the read-to-write ratio may be determined to be 1:2, or some variant thereof.

In another embodiment, a first storage tier 302*a* may be a source-tier having storage media 304*a*, 304*b*, . . . 304*n* therein for storing data, and a second storage tier 302*b* may be a destination-tier having storage media 308*a*, 308*b*, . . . 308*n* therein for storing data. Additionally, in one embodiment, a source-tier cache 306*a* may be dedicated to the source-tier 302*a*, and a destination-tier cache 306*b* may be dedicated to the destination-tier 302*b*. In one approach, the source-tier cache 306*a* may be used only for data stored in the source-tier 302*a*, and the destination-tier cache 306*b* may be used only for data stored in the destination-tier 302*b*.

According to one embodiment, an extent is a contiguous block of data stored to one of the storage tiers 302a, 302b, . . . 302n. In one preferred embodiment, an extent is set at a total size of the extent on the storage media, such as 256 MB, 512 MB, 1 GB, 2 GB, etc. In another embodiment, the size of the extent may be determined based on some aspect of the storage media, such as 0.01%, 0.1%, 0.5%, 1%, 2%, 5%, 10%, 15%, etc., of the storage media's total storage capacity, of the storage tier's total storage capacity, etc.

Figure 4:
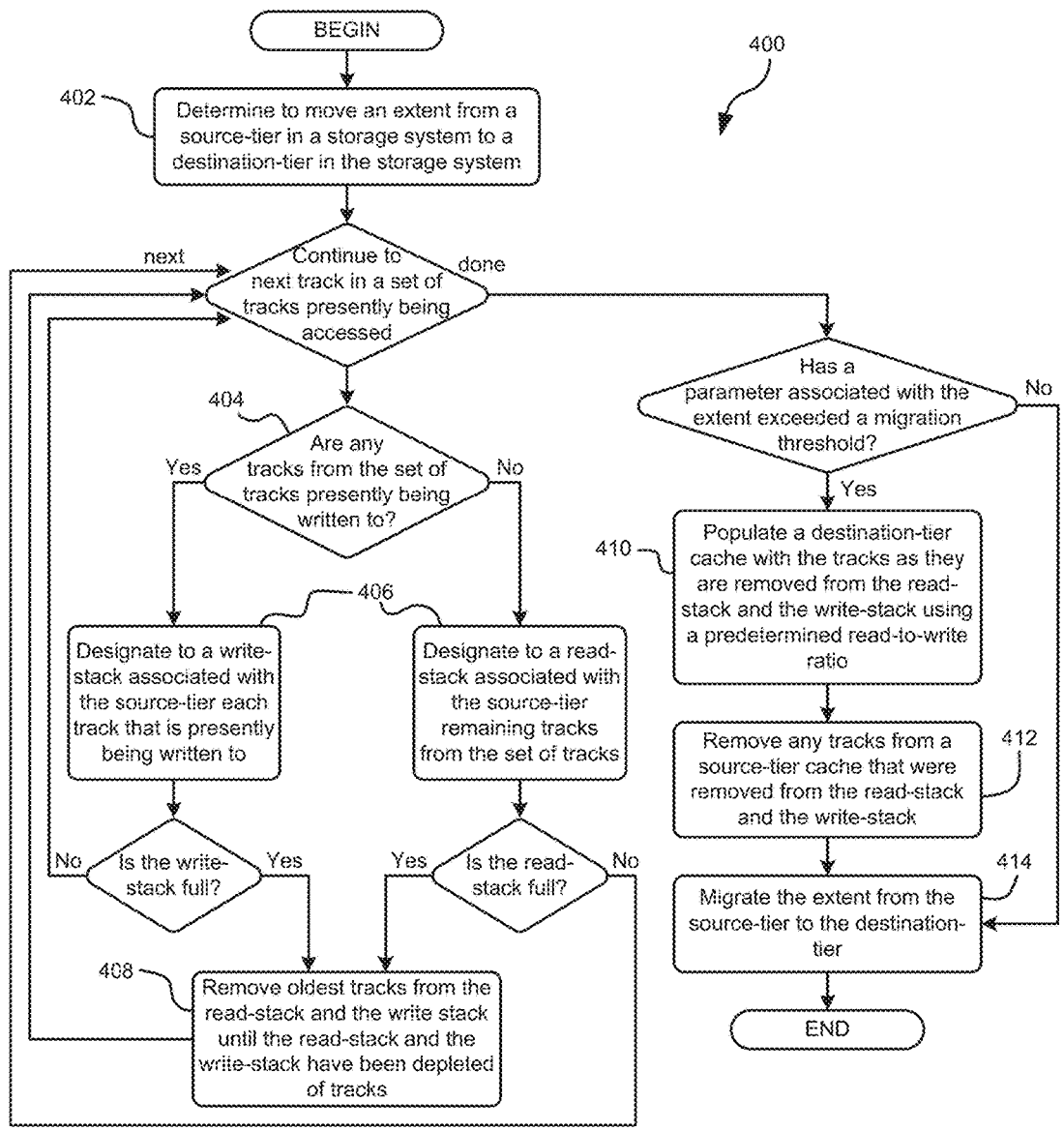
FIG. 4 shows a flowchart of a method according to one embodiment.

Now referring to FIG. 4, a method 400 is shown according to one embodiment. The method 400 may be carried out in any desired environment, including those described in FIGS. 1-3. For the purposes of the description of method 400, a write-stack and a read-stack may be configured to have buffers that operate in a last-in, first-out (LIFO) arrangement, according to one embodiment.

One of the goals of the method 400 is to maximize the amount of 'hits' that are achieved for any given track that is in a storage tier's cache. That is, if data is attempting to be accessed from a storage tier, it is better for that data to be accessed from the cache, which is typically comprised of fast to access memory types, such as SSD, as opposed to trying to access the data from a lower storage tier, which is then migrated to the cache to be accessed by the requester. Therefore, the method 400 presents one embodiment that maximizes hits while migrating data.

Any of the descriptions, approaches, and/or embodiments described above in regard to the storage system 300 in FIG. 3 are applicable to the descriptions of the method 400 in FIG. 4, below.

In operation 402, a determination is made to move an extent from a source-tier in a storage system to a destination-tier in the storage system. A set of tracks of the extent is presently being accessed, which causes problems for conventional migration methods, but are resolved using method 400, as described below.

According to one embodiment, one of the destination-tier and the source-tier may include SSD storage media, and the other tier may include at least one of: SSD, HDD, and magnetic tape drive storage media.

In operation 404, it is determined whether any track from the set of tracks is presently being written to. Since the tracks in the set of tracks are being accessed, they are either being written to or being read from. Therefore, this operation could be determining which tracks are being read from.

In operation 406, the tracks that are being written to are designated to a write-stack associated with the source-tier, and tracks that are not being written to are designated to a read-stack associated with the source-tier. The write-stack and the read-stack may be of types known in the art.

In operation 408, oldest tracks from the read-stack and the write-stack are removed until the read-stack and the write-stack have been depleted of tracks. Once the write-stack and the read-stack have been depleted of tracks, it is assured that no more changes will be made to data stored to the extent, and therefore a migration of data is possible without losing changes to the data in the extent, according to one embodiment.

In operation 410, a destination-tier cache is populated with the tracks as they are removed from the read-stack and the write-stack using a predetermined read-to-write ratio when a parameter of the extent exceeds a migration threshold. If the extent does not exceed the migration threshold, then operation 412 is skipped.

In operation 412, any tracks that were removed from the read-stack and the write-stack are removed from a source-tier cache. This ensures that duplicate tracks are not migrated to the destination tier, particularly when considering that changes may be made to the tracks once they are populated in the destination-tier cache, which may be subsequently overwritten if they still exist in the source-tier cache upon migration.

In operation 414, the extent on the source-tier is migrated to the destination-tier. This operation, in one embodiment, includes migrating the source-tier cache to the destination-tier cache, and migrating the data from the extent to a second extent on the destination-tier. In one embodiment, any tracks which had changes made to them in the write-stack and read-stack prior to populating the destination-tier cache with these files are migrated to the destination-tier and stored to the second extent, either in the destination-tier cache or in destination-tier storage media.

A computer program product may include any of the embodiments and approaches described above, as would be known to one of skill in the art. The computer program product may include a computer readable storage medium having computer readable program code embodied therewith. For example, the computer readable program code may include computer readable program code configured to determine to move an extent from a source-tier in a storage system to a destination-tier in the storage system, wherein a set of tracks of the extent is presently being accessed, computer readable program code configured to determine whether any track from the set of tracks is presently being written to, computer readable program code configured to designate to a write-stack associated with the source-tier each track that is presently being written to and designate to a read-stack associated with the source-tier remaining tracks from the set of tracks, computer readable program code configured to remove oldest tracks from the read-stack and the write-stack until the read-stack and the write-stack have been depleted of tracks, (when a parameter of the extent exceeds a migration threshold, the computer program product may include computer readable program code configured to populate a destination-tier cache with the tracks as they are removed from the read-stack and the write-stack using a predetermined read-to-write ratio and computer readable program code configured to remove any tracks from a source-tier cache that were removed from the read-stack and the write-stack), and computer readable program code configured to migrate the extent from the source-tier to the destination-tier.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A storage system, comprising:
a processor and logic integrated with the processor, executable by the processor, or integrated with and executable by the processor, the logic being configured to:
determine to move an extent from a source-tier in a storage system to a destination-tier in the storage system, wherein a set of tracks of the extent is presently being accessed;
populate a destination-tier cache with tracks as they are removed from a read-stack associated with the source-tier and/or a write-stack associated with the source-tier using a predetermined read-to-write ratio in response to determining that a parameter of the extent exceeds a migration threshold;
determine whether any track from the set of tracks is presently being written to;
designate to the write-stack each track that is presently being written to; and
designate to the read-stack remaining tracks from the set of tracks.

2. The storage system as recited in claim 1, comprising:
the source-tier having storage media therein for storing data; and
the destination-tier having storage media therein for storing data.

3. The storage system as recited in claim 1, wherein the extent is a contiguous block of data.

4. The storage system as recited in claim 1, wherein the parameter is related to a frequency of data access requests in the extent.

5. The storage system as recited in claim 1, comprising:
a source-tier cache dedicated to the source-tier; and
the destination-tier cache dedicated to the destination-tier, wherein the source-tier cache is used only for data stored in the source-tier, and wherein the destination-tier cache is used only for data stored in the destination-tier.

6. The storage system as recited in claim 1, wherein the read-to-write ratio is determined based on an amount of tracks in the write-stack as compared to an amount of tracks in the read-stack.

7. The storage system as recited in claim 1, wherein one of the destination-tier and the source-tier comprise solid state device (SSD) storage media, and wherein the other tier comprises at least one of: SSD, hard disk drive (HDD), and magnetic tape drive storage media.

8. A computer-implemented method, comprising:
determining to move an extent from a source-tier in a storage system to a destination-tier in the storage system, wherein a set of tracks of the extent is presently being accessed; and
in response to determining that a parameter of the extent exceeds a migration threshold, populating a destination-tier cache with tracks as they are removed from a read-stack associated with the source-tier and/or a write-stack associated with the source-tier using a predetermined read-to-write ratio; and
determining whether any track from the set of tracks is presently being written to, designating to the write-stack each track that is presently being written to, and designating to the read-stack remaining tracks from the set of tracks.

9. The method as recited in claim 8, wherein the extent is a contiguous block of data.

10. The method as recited in claim 8, wherein the parameter is related to a frequency of data access requests in the extent.

11. The method as recited in claim 8, wherein the read-to-write ratio is determined based on an amount of tracks in the write-stack as compared to an amount of tracks in the read-stack.

12. The method as recited in claim 8, wherein one of the destination-tier and the source-tier comprise solid state device (SSD) storage media, and wherein the other tier comprises at least one of: SSD, hard disk drive (HDD), and magnetic tape drive storage media.

13. The method as recited in claim 8, wherein comprising removing oldest tracks from the read-stack and the write-stack until the read-stack and the write-stack have been depleted of tracks.

14. A computer program product, comprising a computer readable storage medium having program instructions embodied therewith, the program instructions executable by a processor to cause the processor to perform a method comprising:
determining, by the processor, to move an extent from a source-tier in a storage system to a destination-tier in the storage system, wherein a set of tracks of the extent is presently being accessed;
populating, by the processor, a destination-tier cache with tracks as they are removed from a read-stack associated with the source-tier and/or a write-stack associated with the source-tier using a predetermined read-to-write ratio in response to determining that a parameter of the extent exceeds a migration threshold; and
determining whether any track from the set of tracks is presently being written to;
designating to the write-stack each track that is presently being written to; and
designating to the read-stack remaining tracks from the set of tracks.

15. The computer program product as recited in claim 14, wherein the extent is a contiguous block of data.

16. The computer program product as recited in claim 14, wherein the parameter is related to a frequency of data access requests in the extent.

17. The computer program product as recited in claim 14, wherein the read-to-write ratio is determined based on an amount of tracks in the write-stack as compared to an amount of tracks in the read-stack.

* * * * *